United States Patent [19]
Ando

[11] Patent Number: 5,957,792
[45] Date of Patent: Sep. 28, 1999

[54] CABLE SUPPORT FOR A DERAILLEUR

[75] Inventor: Yoshiaki Ando, Sakai, Japan

[73] Assignee: Shimano, Inc., Osaka, Japan

[21] Appl. No.: 08/972,097

[22] Filed: Nov. 17, 1997

Related U.S. Application Data

[63] Continuation of application No. 08/586,381, Jan. 16, 1996.

[51] Int. Cl.$^6$ .............................. F16H 61/00; F16H 7/22
[52] U.S. Cl. ............................................. 474/83; 474/127
[58] Field of Search .................................. 474/49, 70, 72, 474/80, 81, 82, 83, 127, 128, 129

[56] References Cited

U.S. PATENT DOCUMENTS

| | | | |
|---|---|---|---|
| 3,798,988 | 3/1974 | Nagano | 74/240 |
| 4,235,118 | 11/1980 | Huret | 74/217 |
| 4,452,593 | 6/1984 | Coue | 474/80 |
| 4,530,677 | 7/1985 | Nagano | 474/80 |
| 4,789,379 | 12/1988 | Ozaki et al. | 474/82 |
| 4,840,605 | 6/1989 | Testa | 474/80 |
| 4,887,482 | 12/1989 | Romano | 74/502.6 |
| 5,295,916 | 3/1994 | Chattin | 474/78 |
| 5,346,434 | 9/1994 | Hsu | 474/82 |
| 5,421,786 | 6/1995 | Ando | 474/78 |
| 5,456,637 | 10/1995 | Chang | 474/78 |

FOREIGN PATENT DOCUMENTS

| | | | |
|---|---|---|---|
| 0091324 | 10/1983 | European Pat. Off. | 474/82 |
| 0 771 720 A1 | 5/1997 | European Pat. Off. | B62M 9/12 |
| 93 13 254 | 12/1993 | Germany | B62M 25/02 |

*Primary Examiner*—Tamara L. Graysay
*Assistant Examiner*—Matthew A. Kaness
*Attorney, Agent, or Firm*—James A. Deland

[57] ABSTRACT

A cable support member includes a base member having an opening for receiving a fastener for fastening the base member to the bicycle. First and second spaced apart cable guides are integrally formed with and extend from the base member. The first and/or second cable guides may be formed as panels, each of which may have an opening for receiving a derailleur cable therethrough A rib may be provided which extends from the first cable guide toward the second cable guide to help reinforce the first and second cable guides.

26 Claims, 4 Drawing Sheets

CABLE SUPPORT FOR A DERAILLEUR

This application is a continuation of 08/586,381 filed Jan. 16, 1996.

BACKGROUND OF THE INVENTION

The present invention is directed to bicycle derailleurs, and, more specifically, to a support for the cable which operates the derailleur.

FIG. 1 shows a prior art bicycle derailleur (10) affixed to a mounting member (14). Mounting member (14) may be a separate mounting member that is adapted to be affixed to a bicycle frame, or it may be a portion of the bicycle frame itself. Derailleur (10) includes a base member (18) affixed to mounting member (14) through a bolt (22); a linkage mechanism (26); and a chain guide assembly (30). Base member (18) may be the main attachment member for the derailleur, or it may be a cover for the main attachment member for the derailleur. An end of an inner cable (34) of a derailleur cable (38) is affixed to chain guide assembly (30) through a cable fixing bolt (42). An outer casing (46) of derailleur cable (38) is supported by a separate cable retainer (50). When inner cable (34) is pulled or released, chain guide assembly (30) moves relative to base member (18) in a known manner to shift a chain (no shown) among a plurality of sprockets shown schematically at (54).

Prior art derailleurs such as derailleur (10) have the disadvantage that a separate cable retainer (50) is used to fix the derailleur cable (38) to the derailleur. This increases the manufacturing expense of the derailleur and makes assembly more complicated. Some prior art derailleurs mold the cable retainer with the base member (18) as a very thick portion of the base member which is subsequently drilled with a bore to receive the derailleur cable. The disadvantage of this structure is that a substantial amount of the material used to form the base member is wasted because of the drilled bore, and the drilling operation adds to the time and expense of manufacture.

SUMMARY OF THE INVENTION

The present invention is directed to a cable support for a bicycle derailleur wherein the cable retainer is integrally formed with the base member in a manner which does not increase the time and expense of manufacture, and which does not significantly waste material in the manufacturing process. In one embodiment of the present invention, a cable support member includes a base member having an opening for receiving a fastener for fastening the base member to the bicycle. First and second spaced apart cable guides are integrally formed with and extend from the base member. In a more specific embodiment, the first and/or second cable guides may be formed as panels, each of which may have an opening for receiving a portion of a derailleur cable therethrough. Furthermore, a rib may be provided which extends from the first cable guide toward the second cable guide to help reinforce the first and/or second cable guides. In any event, a cable support member constructed in accordance with the present invention may be stamped from sheet metal or may be molded from plastic or some other material very inexpensively and without the added steps or waste inherent in the methods used to manufacture prior art structures.

DETAILED DESCRIPTION OF THE EMBODIMENTS

Figure 1:
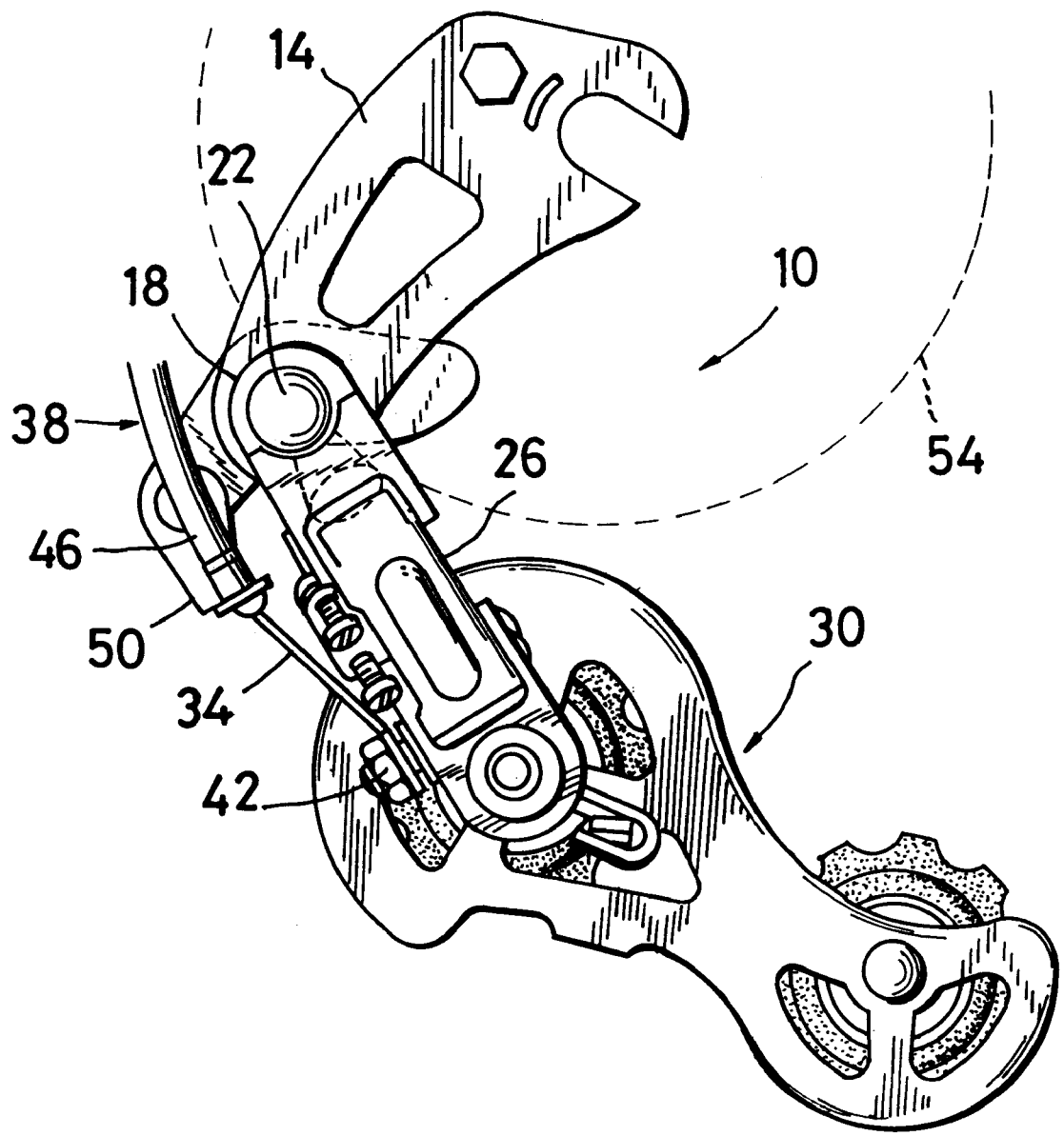
FIG. 1 is a side view of a prior art derailleur.
Figure 2:
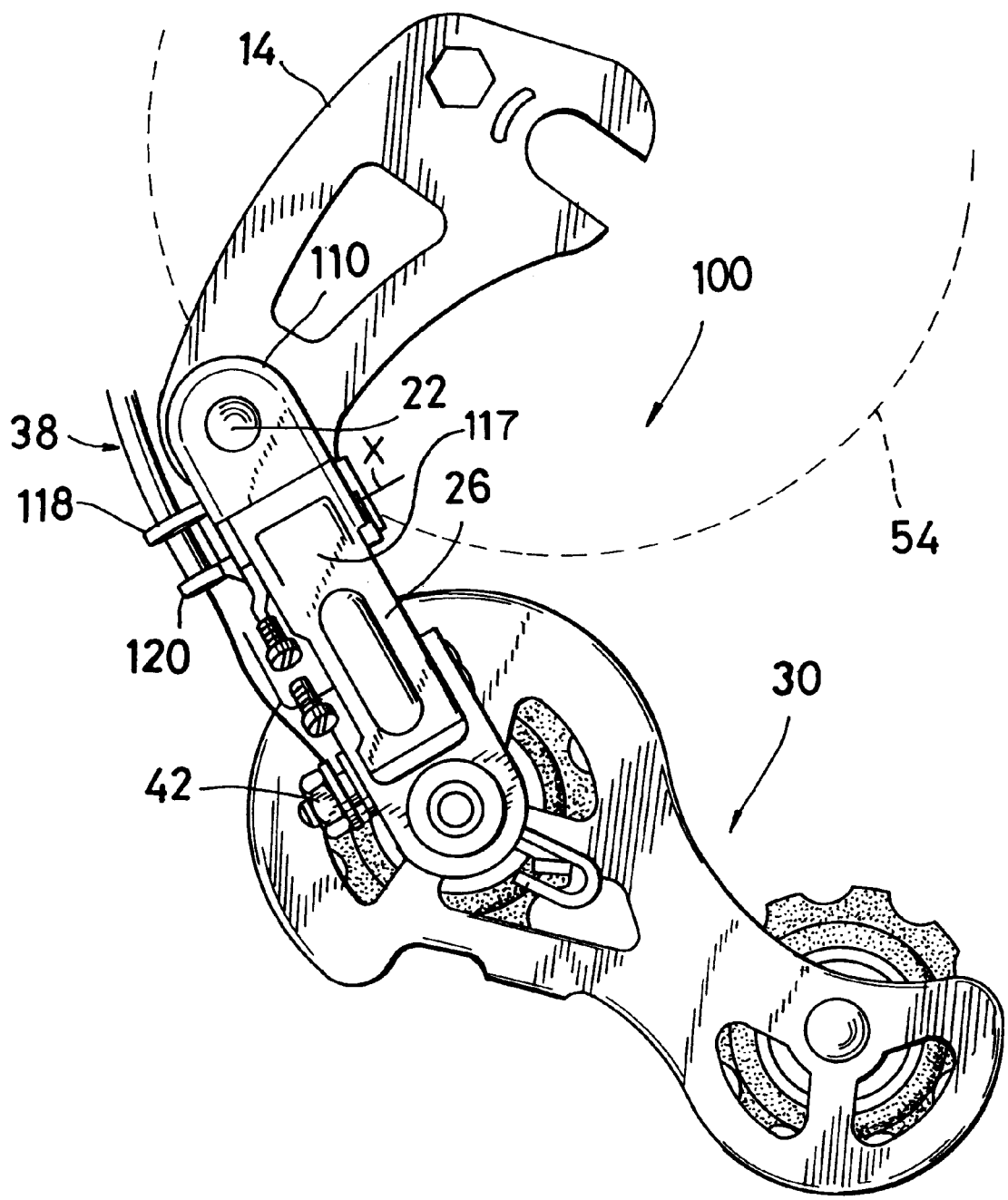
FIG. 2 is a side view of a derailleur using a particular embodiment of a cable support member according to the present invention.

FIG. 2 is a side view of a derailleur (100) according to the present invention. Derailleur (100) is similar to derailleur (10) shown in FIG. 1 in that derailleur (100) also has a mounting member (14), a bolt (22), a linkage mechanism (26), a chain guide assembly (30), a derailleur cable (38), and a cable fixing bolt (42). However, rather than have a separate base member (18) and cable retainer (50), derailleur (100) includes an integrated cable support member (110) which, in this embodiment, performs both functions.

Figure 3:
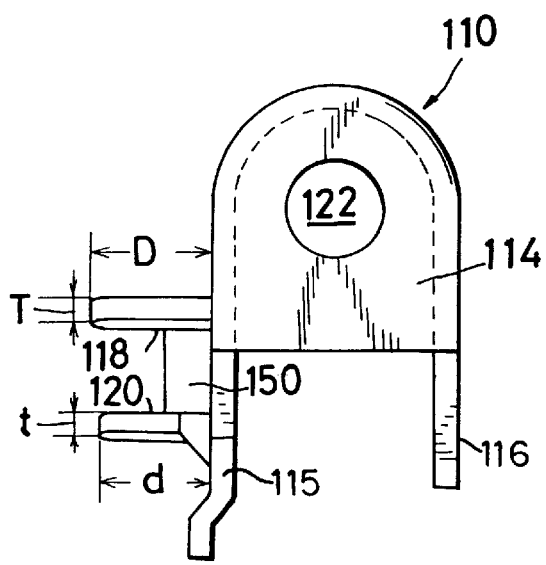
FIG. 3 is a front view of the cable support member shown in FIG. 2.
Figure 4:
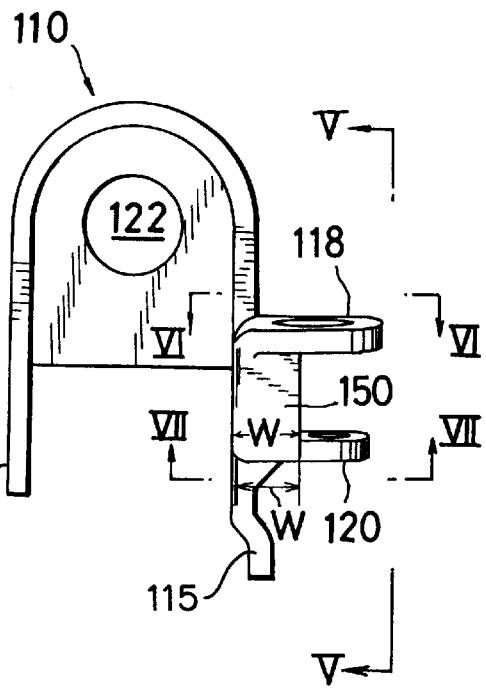
FIG. 4 is a rear view of the cable support member shown in FIG. 3.
Figure 5:
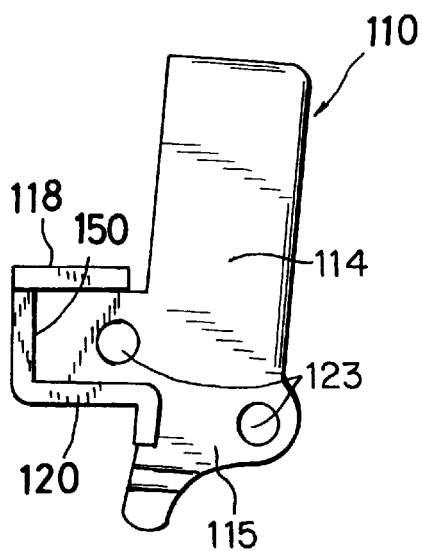
FIG. 5 is a view of the cable support member taken along line V—V in FIG. 4.

FIGS. 3–5 show different views of a particular embodiment of cable support member (110). In this embodiment, cable support member (110) includes a base member (114), a first link attachment member (115) integrally formed as one piece with and extending from base member (114), a second link attachment member (116) integrally formed as one piece with and extending from base member (114) and first and second cable guides (118,120) extending as one piece from a side surface of first link attachment member (115). First link attachment member (115) and second link attachment member (116) are spaced apart from each other for receiving a derailleur link member (117) of linkage mechanism (26) therebetween as shown in FIG. 2 so that the derailleur link member (117) pivots around an axis (X) extending through the first link attachment member (115) and the second link attachment member (116). Base member (114) includes an opening (122) for receiving a fastener (such as bolt (22)) for fastening base member (114) to the bicycle.

In this embodiment, first and second cable guides (118, 120) are formed as flat panels; the diameter D of first cable guide (118) is greater than the thickness (T) of first cable guide (118); the diameter (d) of second cable guide (120) is greater than the thickness (t) of second cable guide (120), diameter d is less than or equal to D, and T=t. Of course, the panels do not necessarily have to be flat, and the size, thickness and shape of the panels may be varied according to the application, and the measurements of one panel may be switched with the other.

As with the prior art derailleurs, base member (114) may be the main attachment member for the derailleur, or it may be a cover for the main attachment member for the derailleur. As shown in FIG. 5, base member (114) includes openings (123) for attachment of linkage mechanism (26). Similar openings are also disposed on the other side of base member (114). In this embodiment cable support member (110) is stamped from sheet metal, but it also may be formed from cast or molded metal or plastic.

Figure 6A:
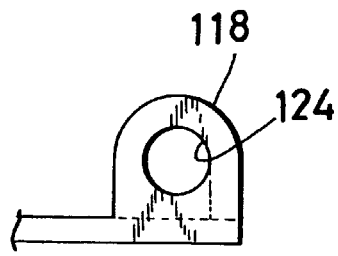
FIG. 6A is a view of the cable support member taken along line VI—VI in FIG. 4.
Figure 6B:
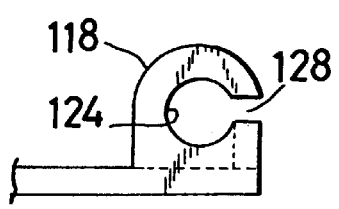
FIG. 6B is a view of an alternative embodiment of the portion of the cable support member shown in FIG. 6A.

FIG. 6A is a view of first cable guide (118) taken along line VI—VI in FIG. 4. As shown in FIG. 6A, first cable guide (118) has an opening (124) for receiving a portion of the derailleur cable (38) therethrough. Preferably, opening (124) is wide enough to receive the outer casing (46) of derailleur cable (38), but such a width is not necessary and may be smaller if desired. Furthermore, as shown in FIG. 6B, first cable guide (118) may include a passage (128) which allows a portion of derailleur cable (38) to pass through the side thereof. Groove (128) may be sufficiently big to allow outer casing (46) to pass through, preferably with some interference, but it may also be sized to allow inner cable (34) but not outer casing (46) to pass through.

Figure 7A:
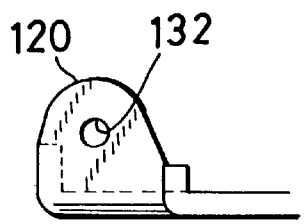
FIG. 7A is a view of the cable support member taken along line VII—VII in FIG. 4.
Figure 7B:
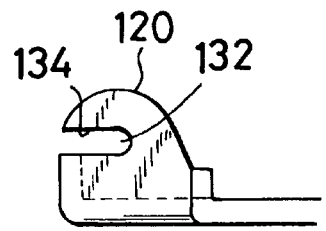
FIG. 7B is a view of an alternative embodiment of the portion of the cable support member shown in FIG. 7A.

FIG. 7A is a view of second cable guide (120) taken along line VII—VII in FIG. 4. As shown in FIG. 7A, second cable guide (120) has an opening (132) for receiving a portion of the derailleur cable (38) therethrough. In this embodiment, opening (132) is wide enough to receive the inner cable (34) but not outer casing (46) of derailleur cable (38), but such a width is not necessary and may be larger if desired. Furthermore, as shown in FIG. 7B, second cable guide (120) may include a passage (134) which allows a portion of derailleur cable (38) to pass through the side thereof. In this embodiment, passage (134) is sufficiently big to allow only inner cable (34) to pass through, but again the size of passage (134) may be varied as desired for the particular application.

Figure 8:
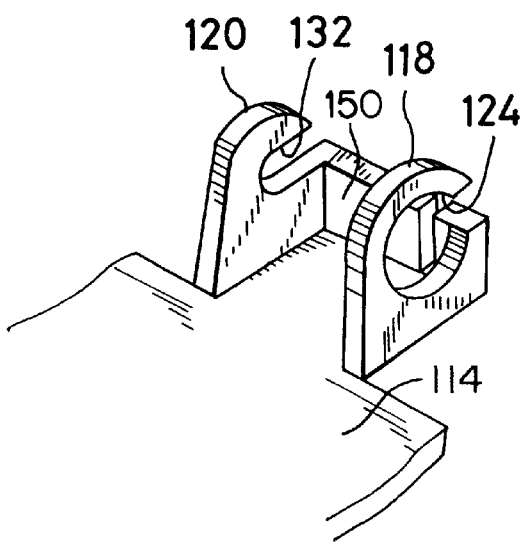
FIG. 8 is a detailed view of an alternative embodiment of a cable support member according to the present invention.

Cable support member (110) also includes a rib (150) which helps to reinforce the first and second cable guides (118,120). In this embodiment, rib (150) extends from the first cable guide (118) toward the second cable guide (120) and connects the first cable guide (118) to the second cable guide (120). Rib (150) may be integrally formed with the first cable guide (118) and/or the second cable guide (120), or the rib may touch first cable guide (118) and/or second cable guide (120) without being integrally formed therewith. For example, FIG. 4 shows rib (150) formed integrally with second cable guide (120) and touching first cable guide (118). Alternatively, rib (150) may extend toward first cable guide (118) and/or second cable guide (120) without actually touching the cable guide. For example, FIG. 8 shows rib (150) integrally formed with second cable guide (120) and extending toward first cable guide (118) but without touching first cable guide (118). This construction is useful when the entire derailleur cable (38) fits within first cable guide (118) so that most of the force exerted by the shifting operation is borne by second cable guide (120). In this case reinforcement of second cable guide (120) may be desirable, but reinforcement of first cable guide (118) is unnecessary. Rib (150) need only extend far enough to provide reinforcement of second cable guide (120) and may be quite short.

In this embodiment, rib (150) is integrally formed with base member (114), but such a construction is not necessary. Furthermore, rib (150) need not extend along the surface of the base member as shown. In some applications rib (150) may be placed at some other location along the periphery of first and second cable guides (118,120). While rib (150) is shown with a width (W) less than the diameter of first and second cable guides (118,120) to save material and facilitate manufacture, it may be desirable to form rib (150) with a diameter equal to first cable guide (118) and/or second cable guide (120), or even with a larger width, in which case rib (150) would bend around the top of first cable guide (118) and/or second cable guide (120).

While the above is a description of various embodiments of the present invention, further modifications may be employed without departing from the spirit and scope of the present invention. Thus, the scope of the invention should not be limited by the specific structures disclosed. Instead, the true scope of the invention should be determined by the following claims.

What is claimed is:

1. A cable support member for a bicycle derailleur having a chain guide assembly and a linkage mechanism including a derailleur link member pivotably connected to the chain guide assembly comprising:

a base member having an opening for receiving a fastener for fastening the base member to a bicycle;

a first link attachment member integrally formed as one piece with and extending from the base member;

a second link attachment member integrally formed as one piece with and extending from the base member;

wherein the first link attachment member and the second link attachment member are spaced apart from each other for pivotably receiving the derailleur link member therebetween so that the derailleur link member pivots around an axis extending through the first link attachment member and the second link attachment member;

a first cable guide integrally formed as one piece with and extending from the base member, the first cable guide having a first opening for receiving a portion of a derailleur cable therethrough;

a second cable guide integrally formed as one piece with and extending from the base member, the second cable guide having a second opening for receiving a portion of the derailleur cable therethrough;

wherein the first cable guide is spaced apart from the second cable guide;

a rib projecting from the base member and extending from the first cable guide toward the second cable guide;

wherein the rib is perpendicular to the first cable guide, to the second cable guide and to the base member.

2. The cable support member according to claim 1 wherein the first cable guide is formed as a first panel and wherein the second cable guide is formed as a second panel.

3. The cable support member according to claim 2 wherein a thickness of the first panel is less than a diameter of the first panel.

4. The cable support member according to claim 3 wherein a thickness of the second panel is less than a diameter of the second panel.

5. The cable support member according to claim 4 wherein the thickness of the first panel is equal to the thickness of the second panel.

6. The cable support member according to claim 5 wherein the diameter of the first panel is equal to the diameter of the second panel.

7. The cable support member according to claim 1 wherein the first opening is larger than the second opening.

8. The cable support member according to claim 1 wherein the first cable guide defines a first passage through a side of the first cable guide into the first opening.

9. The cable support member according to claim 8 wherein the second cable guide defines a second passage through a side of the second cable guide into the second opening.

10. The cable support member according to claim 9 wherein the first opening is larger than the second opening.

11. The cable support member according to claim 10 wherein the first opening is unthreaded, and wherein the second opening is unthreaded.

12. The cable support member according to claim 1 wherein the rib connects the first cable guide and the second cable guide.

13. The cable support member according to claim 1 wherein the rib is integrally formed with the first cable guide.

14. The cable support member according to claim 13 wherein the rib is integrally formed as one piece with the second cable guide.

15. The cable support member according to claim 1 wherein the rib has a width less than a diameter of at least one of the first cable guide or the second cable guide.

16. The cable support member according to claim 15 wherein the rib has a width less than a diameter of both the first cable guide and the second cable guide.

17. The cable support member according to claim 1 wherein the first cable guide is formed as a first panel, and wherein the second cable guide is formed as a second panel.

18. The cable support member according to claim 1 wherein the first opening is larger than the second opening.

19. The cable support member according to claim 18 wherein the first opening is unthreaded, and wherein the second opening is unthreaded.

20. The cable support member according to claim 1 wherein the first cable guide defines a first passage through a side of the first cable guide into the first opening.

21. The cable support member according to claim 20 wherein the second cable guide defines a second passage through a side of the second cable guide into the second opening.

22. The cable support member according to claim 1 wherein the first link attachment member includes a first link attachment opening for attaching the linkage mechanism thereto, and wherein the second link attachment member includes a second link attachment opening for attaching the linkage mechanism thereto.

23. The cable support member according to claim 22 wherein the first link attachment member includes a third link attachment opening for attaching the linkage mechanism thereto, and wherein the second link attachment member includes a fourth link attachment opening for attaching the linkage mechanism thereto.

24. A bicycle derailleur comprising:
a chain guide assembly;
a linkage mechanism including a derailleur link member pivotably connected to the chain guide assembly;
a base member having an opening for receiving a fastener for fastening the base member to a bicycle;
a first link attachment member integrally formed as one piece with and extending from the base member;
a second link attachment member integrally formed as one piece with and extending from the base member;
wherein the first link attachment member and the second link attachment member are spaced apart from each other;
wherein the linkage mechanism is pivotally connected between the first link attachment member and the second link attachment member so that the derailleur link member pivots around an axis extending through the first link attachment member and the second link attachment member;
a first cable guide integrally formed as one piece with and extending from the base member, the first cable guide having a first opening for receiving a portion of a derailleur cable therethrough;
a second cable guide integrally formed as one piece with and extending from the base member, the second cable guide having a second opening for receiving a portion of the derailleur cable therethrough;
wherein the first cable guide is spaced apart from the second cable guide;
a rib projecting from the base member and extending from the first cable guide toward the second cable guide;
wherein the rib is perpendicular to the first cable guide to the second cable guide and to the base member.

25. The derailleur according to claim 24 wherein the first opening is larger than the second opening.

26. The derailleur according to claim 25 wherein the first opening is unthreaded, and wherein the second opening is unthreaded.

* * * * *